United States Patent [19]

Newby

[11] 3,954,934

[45] May 4, 1976

[54] METHOD FOR FORMING UNIFORM MOLD CHANGES INCLUDING SEVERING A MILLED AND STRETCHED ELASTOMERIC MATERIAL

[76] Inventor: Gordon L. Newby, 320 Industrial St., Bakersfield, Calif. 93307

[22] Filed: Jan. 31, 1975

[21] Appl. No.: 545,819

Related U.S. Application Data

[62] Division of Ser. No. 381,530, July 23, 1973, Pat. No. 381,530, which is a division of Ser. No. 224,115, Feb. 7, 1972, Pat. No. 3,758,249.

[52] U.S. Cl. .................................. 264/146; 83/17; 156/270; 264/138; 264/160; 264/163; 264/175; 264/229; 264/288
[51] Int. Cl.² ........................................... B29H 3/06
[58] Field of Search ........... 264/138, 145, 146, 148, 264/151, 157, 160, 175, 288, 229, 163; 156/164, 229, 269, 270, 324; 83/17

[56] References Cited
UNITED STATES PATENTS

| | | | |
|---|---|---|---|
| 1,612,724 | 12/1926 | Housekeeper | 264/145 |
| 1,777,076 | 9/1930 | Cumfer | 264/160 |
| 1,993,082 | 3/1935 | Blair et al. | 264/160 |
| 2,039,619 | 5/1936 | Batcheller | 264/160 |
| 2,167,734 | 8/1939 | Zonino | 264/160 |
| 2,540,195 | 2/1951 | Engler | 264/146 |
| 3,801,406 | 4/1974 | Debenedetti | 264/145 |

*Primary Examiner*—Willard E. Hoag
*Attorney, Agent, or Firm*—Huebner & Worrel

[57] ABSTRACT

A method for forming rubber slugs of precisely determined masses. The method embodying the instant invention may be performed utilizing a machine characterized by a stripper unit which serves to extract a continuous, uniformly dimensioned strip of rubber from an endless sheet provided about a roller of a rubber mill, a platen roller, disposed adjacent to the rubber mill and driven at a substantially constant angular velocity, adapted to receive the strip in an adhering relationship for tensioning the extracted strip and a reciprocating knife for transversely severing the tensioned strip into slugs of predetermined lengths, whereby the mass of each of the resulting slugs is precisely determined.

3 Claims, 7 Drawing Figures

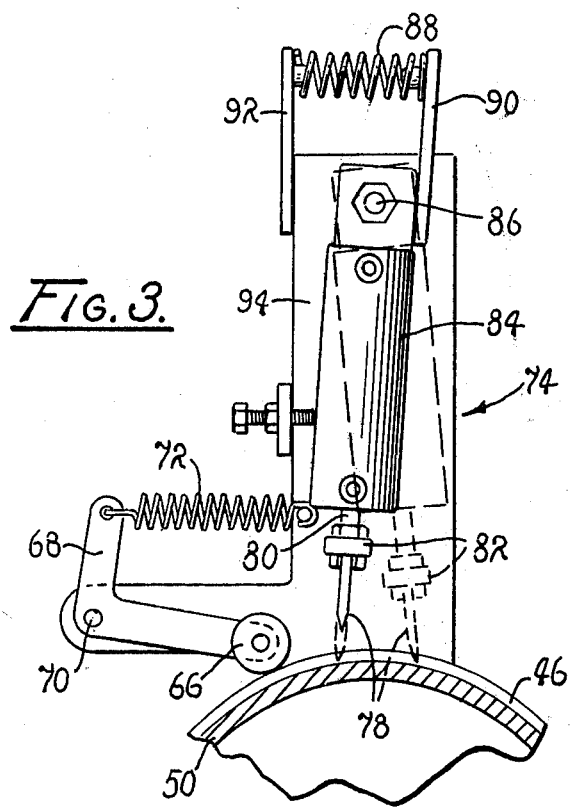
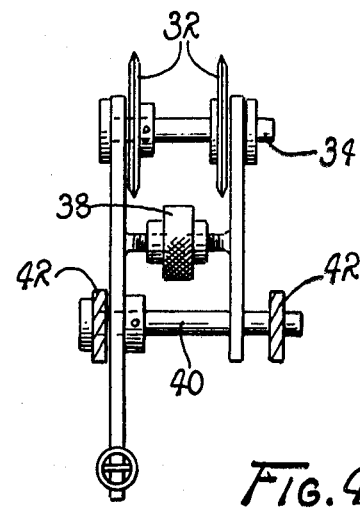
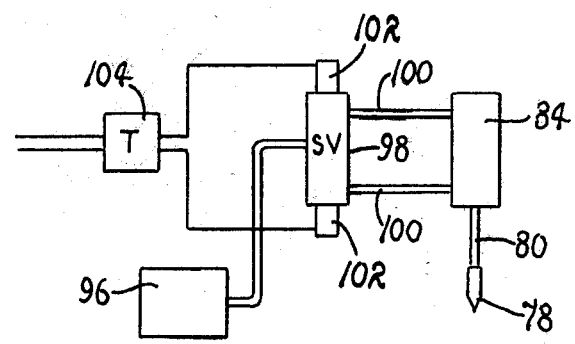
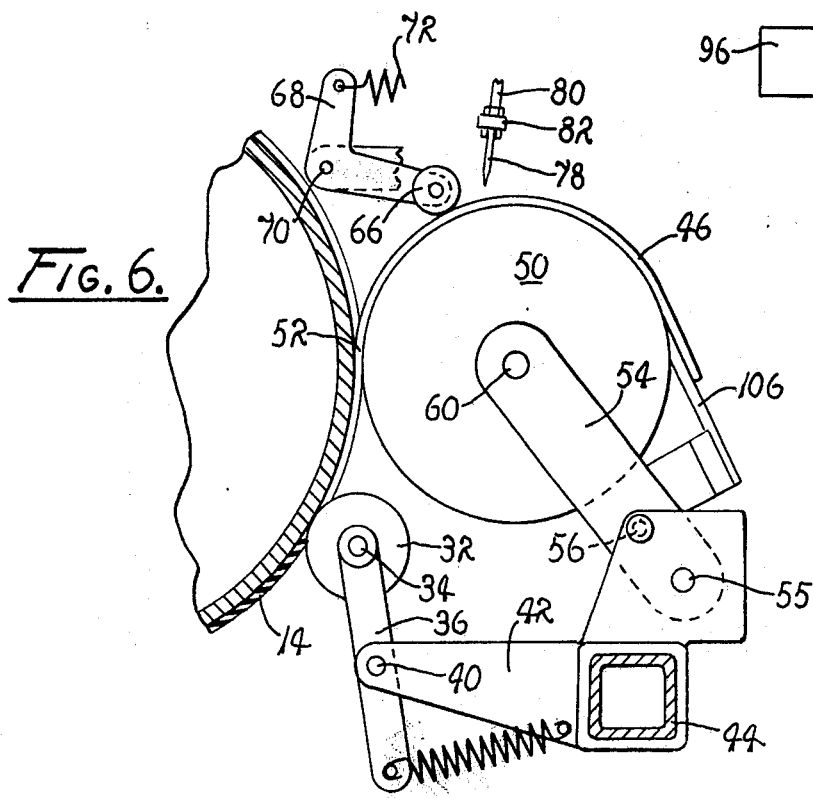
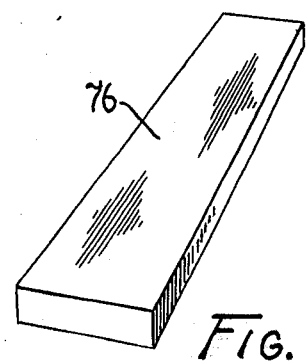

METHOD FOR FORMING UNIFORM MOLD CHANGES INCLUDING SEVERING A MILLED AND STRETCHED ELASTOMERIC MATERIAL

CROSS REFERENCE TO RELATED APPLICATION

This application is a divisional application of U.S. application Ser. NO. 381,530, filed July 23, 1973, now U.S. Letters Pat. No. 381,530, which application is, in turn, a divisional application of U.S. application Ser. No. 224,115, filed Feb. 7, 1972, now U.S. Letters Pat. No. 3,758,249.

BACKGROUND OF THE INVENTION

The invention relates to a method for severing slugs from flexible materials, and more particularly to an improved method for forming from a continuous strip of rubber, a plurality of slugs, each being of a precisely determined mass.

As is well understood by those familiar with the fabrication of rubber products, slugs often are produced through the use of a rubber mill which includes a pair of mutually spaced rollers driven at a constant rate for delivering a sheet of rubber of a constant thickness between the bite of the rollers. In practice, rubber heated through internal friction is fed to the bite whereupon a sheet of rubber is caused to adhere to the surface of one of the rollers of the pair to thus form a "band" about the roller with the sheet's thickness being determined by the spacing between the rollers. Frequently, a continuous strip of rubber is severed from the sheet through the use of a pair of coaxially related, mutually spaced rotary knives, or disk cutters, pressed against the roller about which the sheet is banded for thereby severing a continuous strip of rubber from the sheet. As the strip is removed from the sheet a void is caused to appear therein. However, additional rubber fed between the bite serves to fill the resulting void. Thus, the resulting strip, as a practical matter, can be considered to be a strip of an indeterminate length severed from an endless sheet.

Heretofore, a strip of rubber thus derived from a rubber mill has been conveyed by a suitable conveyor to a rubber extruder or, alternatively, deposited on a table and cut into lengths for loading molds of a myriad of configurations. As is recognized by those familiar with the art of fabricating products from rubber stock material, a strip removed from a mill, in the manner aforedescribed, becomes unstressed or relaxed, once it has been severed, whereupon contraction and attendant deformation occurs. Of course, the amount of heat present in the strip and the memory or nerve of the rubber being processed is not precisely predictable and often is non-uniform in nature. Consequently, the cross-sectional dimensions of a given strip cannot be predicated with absolute certainty. Therefore, slugs of rubber derived by severing strips taken from the surface of a roller within a rubber mill tend to be of an inaccurately established mass.

For reasons which should readily be apparent, an appropriate quantity of rubber must be provided for each mold into which a slug is fed in order to assure an economic production of finished products which meet the standards established for high-quality products. For example, where either insufficient or excessive amounts of rubber are fed to a mold the resulting products do not adequately conform to a preselected norm.

In the past, various attempts have been made to overcome the aforementioned disadvantages by extruding the stock rubber and thereafter severing the extrusions, in their relaxed condition. Flying cutters and the like are used for this purpose. In practice, such techniques often are impractical and simply inadequate.

It should therefore be apparent that there currently exists a need for a practical, economic, and efficient method for forming rubber slugs of precisely determined masses for use in economically fabricating finished products from rubber stock material.

OBJECTS AND SUMMARY OF THE INVENTION

It is therefore an object of the instant invention to provide an improved method for forming slugs from resilient, flexible materials.

It is another object to provide an improved, economic, and efficient method for forming slugs of precisely determined masses from materials having the characteristics of rubber.

It is another object to provide an improved method for severing slugs of predetermined masses from a continuous sheet of elastic material bonded about a mill roll.

It is another object to provide an improved method for severing a continuous strip of elastic material into slugs while the strip is subjected to tension of a predetermined magnitude, whereby slugs of precisely determined mass are provided.

It is another object to provide for a method for forming slugs of rubber from a strip of rubber subjected to tension of a predetermined magnitude so that the mass of the resulting slugs is precisely established before severance from the strip is effected.

These and other objects and advantages of the instant invention are achieved by employing a stripper for deriving a continuous, uniformly dimensioned strip of rubber from an endless sheet, a platen roller driven at a substantially constant angular velocity for receiving and supporting the strip about its periphery, and a reciprocating knife positioned in close proximity with the platen roller and driven at a preselected cyclic rate for severing the strip into segments at predetermined intervals as the strip is supported by the platen roller so that the strip is severed while under tension, whereby the mass of each of the resulting slugs is precisely determined.

BRIEF DESCRIPTION OF THE DRAWINGS

FIG. 3 is a partially sectioned, fragmentary view of the chopper shown in FIG. 2.

FIG. 4 is a fragmented view of disk cutters employed in deriving a continuous strip of rubber from the rubber mill shown in FIG. 1.

FIG. 5 is a schematic view, in block diagram form, of control circuitry employed in achieving an operation of the reciprocating knife.

FIG. 6 is a fragmented, partially sectioned view of an alternate form of the platen roller shown in FIG. 2.

FIG. 7 is a pictorial view of a rubber slug severed from a continuous sheet of rubber fed from the rubber mill shown in FIGS. 1 and 2.

DESCRIPTION OF THE PREFERRED EMBODIMENT

Figures 1, 2:
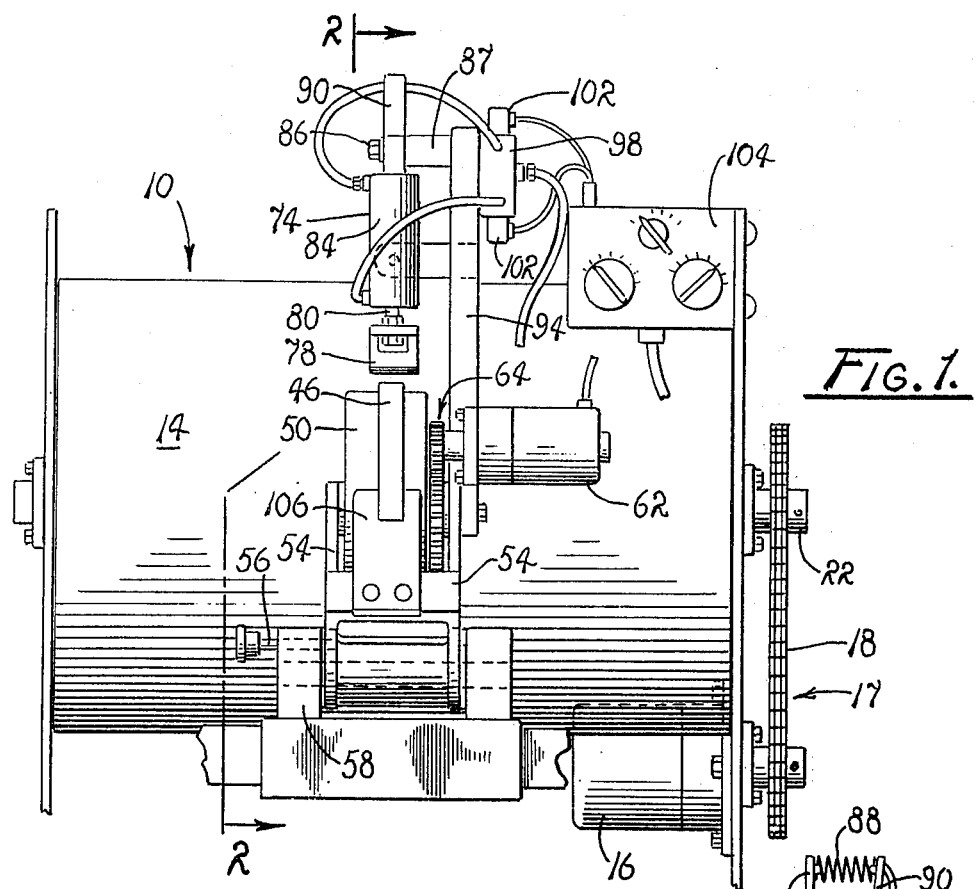
FIG. 1 is a front elevation of a rubber mill and an associated chopper which performs the method embodying the principles of the instant invention.
FIG. 2 is a vertically sectioned view taken generally along line 2—2 of FIG. 1, illustrating relative positions assumed by the rollers of the rubber mill and the platen roller and a reciprocating knife.

Turning now to the drawings wherein like reference characters designate like or corresponding parts throughout the several views, there is shown in FIG. 1 a chopper embodying the principles of the instant invention. As illustrated, the chopper is coupled in close proximity with a rubber mill 10 of a known design.

Very briefly, the rubber mill 10 includes a pair of mill rollers 12 and 14 disposed in mutually spaced, parallel relation defining therebetween a bite through which heated rubber is fed. In practice these rolls are driven in opposed rotation by an electrically energizable motor 16 and a chain-and-sprocket coupling, generally designed 17, of any suitable design. As shown, this coupling includes a chain 18 trained about a sprocket 20 fixed to the supporting axle, not designated, of the roller 12, and a sprocket 22 fixed to the axle, also not designated, of the roller 14. As a practical matter, the rollers 12 and 14 are positioned relative to each other through the use of a pair of laterally movable support blocks 24 which receives therein and supports an axle for the roller 12, FIG. 2.

Since rubber mills of the type herein described are well known and fully understood by those familiar with the fabricating products from rubber stock material, a detailed description of the mounting of the blocks 24 within the mill 10 is omitted in the interest of brevity. However, it is to be understood that the rollers 12 and 14 together define therebetween a bite 26 through which a quantity of stock rubber 28 is fed in a heated, resilient and malleable condition. In practice, such rubber is of a substantially uniform density and is heated through internal friction prior to being fed through the bite 26, and is banded about the roller 14 into a continuous sheet, the thickness of which is determined by the dimension of the bite 26. As a practical matter, a scraper 30 is positioned immediately beneath the bite 26 in scraping engagement with the peripheral surface of the roller 12 for precluding a banding of the rubber about the roller 12. Accordingly, the peripheral surface of the roller 12 is maintained in a "clean" condition through the use of the scraper 30, while banding of the rubber 28 occurs about the roller 14.

Immediately adjacent to the roller 14, in engagement with the peripheral surface thereof, there is supported a pair of mutually spaced disk-shaped rotary knives 32. The knives 32 are supported for rotation by a shaft 34 seated at the distal ends of a pair of arms 36 and arranged in parallelism with the longitudinal axes of the rollers 12 and 14. The pair of arms 36 is provided for supporting the knives 32 in mutually spaced relation and against the periphery of the roller 14. A thumbscrew coupling 38, of any suitable type, is provided for establishing a desired spacing between the arms 36. Since these devices are well known, a detailed description of the thumbscrew 38 is omitted in the interest of brevity.

The arms 36, however, are pivotally supported near their midpoints by a shaft 40 arranged in parallelism with the shaft 34 so that the rotary knives are supported to be pivoted toward the peripheral surface of the roller 14. The shaft 40, in turn, is supported by a rigid pair of arms 42 extended from a transversely oriented beam 44 and supported for adjustment therealong in any suitable manner, not shown. As a practical matter, the rotary knives 32 are urged into engagement with the periphery of the roller 14 through the use of a pair of tension springs 46 coupled between extended portions of the arms 36 and coupled with the arms 42 so that the rotary knives 32 are resiliently urged in pivotal displacement about the shaft 40 toward the periphery of the roller 14.

It can, of course, be appreciated that as the roller 14 is driven in rotation, the rotary knives 32 also are rotated about their shaft 34 for thus severing a continuous strip of rubber, designated 46, from the continuous sheet banded about the roller 14. As the strip 46 is severed, it is directed away from the surface of the roller 14 across the peripheral surface of a platen roller 50 and an arcuate void, not designated, is established in the sheet. This void, in practice, is filled by the rubber 28 as the void approaches the bite 26. In view of the fact that the rubber is heated and is therefore softened, the rubber again is welded into a homogeneous mass as the sheet passes from the bite. Thus, the strip 46, in effect, is derived from the surface of the roller 14 as a continuous strip and directed across the surface of the platen roller 50.

Referring now to FIGS. 1 and 2, it can be seen that the platen roller 50 is supported immediately adjacent to the roller 14 of the rubber mill 10. Preferably, the platen roller 50 is supported in spaced relation with the roller 14 for establishing therebetween a bite 52. The platen roller 50 is supported by a pair of parallel arms 54, each having its base end fixed to the beam 44 by a pair of axially spaced coupling pins 55 and 56 and a bracket 58 also mounted on the beam 44. The roller 50 is supported between the distal ends of the pair of arms 54 by an axle 60 extended therebetween. In practice, the axle is, in turn, supported by bearings, not designated, provided at the distal ends of the arms 54.

Preferably, the platen roller 50 is driven in rotation by an electrically energizable motor 62 suitably supported adjacent to the roller 50 and coupled therewith through a gear train, generally designated 64, including a plurality of spur gears, not designated. The ratio of the speeds of the spur gears of the gear train 64 is such that the angular velocity imparted to the periphery of the platen roller 50 is slightly greater than the angular velocity imparted to the periphery of the roller 14 by the chain-and-sprocket coupling 17. It is, of course, to be understood that the ratio of the angular velocity of the peripheral surface of the roller 50 to that of the roller 14 is a constant ratio so that relative acceleration between the surfaces of these rollers is not experienced, once the rollers are driven at operative speeds.

In practice, the strip 46 severed from the continuous sheet banded about the mill roller 14 is delivered to the peripheral surface of the platen roller 50. Since the rubber is heated, there is a tendency for the rubber to be tacky and thus frictionally adhere to the peripheral surface of the platen roller. Since the angular velocity of the platen roller 50 is slightly greater than that of the roller 14 uniform tension continuously is applied to the strip 46 as it is delivered from the peripheral surface of the mill roller 14 to the peripheral surface of the platen roller 50. Since this tension remains constant, the strip 46 is maintained in a uniformly elongated condition as it is advanced to the periphery of the platen roller 50. As a practical matter, the tackiness of the rubber causes the strip 46 to adhere to the surface of the roller 50 and thus remain elongated after it has been delivered thereto. In practice, an auxiliary pinch roller 66 is provided adjacent the peripheral surface of the platen roller 50, in close proximity with the bite 52 for engaging the adjacent surface of the strip 46 in order to assure that a frictional engagement is established and maintained between the strip 46 and the peripheral surface of the platen roller 50.

While the roller 66 can be mounted in any suitable manner, a bellcrank 68 supported for pivotal rotation about a pivot pin 70 serves quite satisfactorily for this purpose. A tension spring 72 is coupled with the bellcrank for continuously urging the pinch rollers 66 into engagement with the strip 46. Therefore, it is to be understood that as the strip 46 egresses from the bite 52 and is engaged by the peripheral surface of the platen roller 50, it is caused to frictionally adhere to the peripheral surface of the roller. Further, the strip is elongated due to the ratio of the angular velocities of the peripheries of the rollers 14 and 50.

Since the strip 46 adheres to the peripheral surface of the platen roller 50, the elongated addition is maintained as the strip is advanced along an arcuate path defined by the peripheral surface of the platen roller. Immediately above the platen roller 50, adjacent the arcuate path defined by the surface of the platen roller 50, there is a severing mechanism, generally designated 74. This mechanism defines a severing station along the arcuate path at which the strip 46 is severed into a series of discrete segments 76, FIG. 7, often referred to as "slugs".

Turning for a moment to FIG. 3, it is noted that the severing station 74 includes a knife blade 78 rigidly fixed to the distal end of an extensible shaft 80. The knife blade is coupled to the shaft 80 through a suitable coupling 82, while the shaft 80 is, in turn, supported for extension from the cylindrical housing, not designated, of a pneumatic actuator 84. It is to be understood, of course, that the actuator 84 is of a suitable design which includes therein a double-acting piston having a head, not shown, which drives the shaft 80 in rectilinear reciprocation. Extension of the shaft 80, in turn, causes the knife blade 78 to impact against the peripheral surface of the roller 50 and thus the knife blade 78 is driven into a severing relationship with the strip 46 as it is supported at the peripheral surface of the platen roller 50. As can be appreciated, retraction of the shaft 80 withdraws the knife blade out of engagement with the strip.

Since the platen roller 50 is continuously driven at a constant angular velocity, it is desirable to support the pneumatic actuator 84 in a manner such that oscillatory rotation of the knife blade 78 along the arcuate path defined by the surface of the platen roller 50 is accommodated. Hence, a pivot pin 86 is provided as a pivotal support from which the pneumatic actuator 84 is suspended from a transversely oriented base 87. The pin 86 and base 87, collectively, accommodate oscillatory motion of the actuator above the path of the strip 46 as it is advanced through the severing station 74.

As a practical matter, the tension spring 72 is also coupled with the lowermost end of the cylindrical housing of the actuator 84 in a manner such that this end of the spring acts on both the bellcrank 68 and the actuator 84 for urging the actuator housing in pivotal rotation, in a direction toward the upstream end of the arcuate path. A compression spring 88 is fixed to the housing of the pneumatic actuator for also urging the actuator in pivotal displacement so that the knife 78 is urged in displacement toward the upstream end of the arcuate path defined by the periphery of the platen roller 50. An adjustable stop 89 serves to precisely limit pivotal displacement imparted to the housing of the actuator 84 toward the upstream end of the arcuate path traversed by the strip 46. The particular manner in which the spring 88 is supported is a matter of convenience only. However, as shown, the spring 88 is, in practice, supported between a pair of upstanding stop members 90 and 92 fixed to the actuator 84 and a support 94, respectively. The support 94 is provided as a component of the machine's framework and forms no part of the invention. However, it is to be understood that this support provides a fixed base for the bracket member 92.

In view of the fact that the strip 46 is tensioned and elongated as it egresses from the bite 52 and thereafter is caused to frictionally engage and adhere to the peripheral surface of the platen roller 50, its cross-sectional dimensions remain substantially constant until the rubber is removed from the surface of the platen roller 50. Furthermore, since the bite 26 serves to establish a constant thickness for the continuous sheet banded about the roller 14, the spacing between the rotary knives 32 remains constant, and the ratio between the angular velocities of the peripheral surfaces of the roller 14 and the platen roller 50 remains constant, the cross-sectional dimensions of the strip 46 substantially are uniform and constant as the strip progresses along the arcuate path defined by the peripheral surface of the platen roller 50. Hence, segments 76 of a predetermined mass can be severed from the strip 46 while the cross-sectional dimensions of the strip 46 are known and remain constant.

As best shown in FIG. 5, operation of the actuator 84 is controlled by a pneumatic circuit which includes a source of air under pressure, designated 96, a selector valve 98 interposed between the source 96 and the actuator, and a plurality of fluid delivery lines 100. In a manner well-known in the art, the selector valve 98, when operated, reverses pressure conditions established within the housing of the actuator 84 for thereby reversing the direction of rectilinear motion for the shaft 80. This, of course, reverses the direction of the motion of the knife blade 78 affixed to the shaft 80.

In some instances, the shaft 80 of the actuator 84 can be spring-biased, by a spring not shown, which drives the shaft 80 in retraction so that the shaft can be extended under the influence of fluid pressure and retracted in response to an application of recovery forces applied by the spring. However, since accuracy is of utmost importance, reversing pneumatic pressures applied at opposite sides of the head of the doubleacting piston of the actuator 84 is preferred. Thus, the selector valve 98 preferably serves to selectively direct fluid under pressure to the opposite end of the housing of the actuator 84 for driving the shaft 80 in opposite direction, in a positive fashion.

The selector valve 98, in turn, is controlled through a pair of opposed solenoids 102 coupled to a source of voltage, designated V, preferably through a timing circuit 104. While the timing circuit 104 is, in operation, of any suitable design, the circuit preferably is a resistance-capacitance circuit and includes suitable power transistors, not shown. In view of the fact that the timing circuit 104 can be fabricated in any manner preferred, a detailed description of the circuit now employed is omitted in the interest of brevity. However, it is to be understood that the circuit 104 provides energizing pulses applied at appropriate intervals to the solenoids 102 for switching the modes of the selector valve 98, in a manner consistent with the intended purposes thereof. Furthermore, the circuit 104 is so designed that the repetition rate of the output pulse can be varied in order to vary the switching intervals of the selector valve 98.

Once severance of the strip 46 is achieved, removal of the resulting segments is achieved through a use of scraper 106 supported in engagement with the platen roller 50.

It is to be understood that it is preferred that the platen roller 50 be driven in rotation in a manner such that the angular velocity of the peripheral surface exceeds that of the peripheral surface of the roller 14. However, it can be appreciated that where preferred, the motor 62 and associated drive train 64 can be omitted. In the absence of the drive train 64, the platen roller 50 is permitted to engage the periphery of the roller 14. In such circumstances, motion directly is imparted to the roller 50 from the roller 14, as illustrated in FIG. 6.

Where desired, the periphery of the roller 50 can be provided with a knurled ring, not shown, for aiding in establishing a driving engagement with the continuous sheet banded about the mill roller 14 for thus enhancing the driving relationship established between the roller 14 and the platen roller 50. Hence, it should be apparent that tension within the strip 46 thus can be minimized for substantially reducing the tendency of the strip 46 to undergo elongation as it is delivered to the periphery of the platen roller 50. Of course, the cross-sectional dimensions of the strip 46 remain fixed as a consequence of its frictional engagement with the peripheral surface of the platen roller 50, in the manner consistent with that hereinbefore described.

OPERATION

It is believed that in view of the foregoing description, the operation of the embodiment will be readily understood and it will be briefly reviewed at this point.

With the chopper assembled in the manner hereinbeforedescribed and operatively coupled with a rubber mill 10, a quantity of rubber 28 is deposited immediately above the bite 26 of the mill rollers 12 and 14. As rotary motion is imparted to the rollers 12 and 14, by the motor 16 acting through the chain-and-sprocket coupling 17, the roller 14 becomes banded by a continuous sheet of rubber fed from the bite 26. As the resulting sheet is advanced past the rotary knives 32, the strip 46 is severed from the continuous sheet and delivered to the peripheral surface of the platen roller 50, beneath the pinching rollers 66.

Since the strip 46 frictionally adheres to the peripheral surface of the roller 50, the cross-sectional dimensions of the strip remain substantially fixed as the strip progresses about the aforementioned arcuate path defined by the periphery of the platen roller 50. Where the roller 50 is driven by the motor 62 and gear train 64, at a constant rate, such that the angular velocity of the peripheral surface of the platen roller 50 is substantially greater than that of the roller 14, the strip 46 is elongated as it egresses from the bite 52 and is adhered to the peripheral surface of the platen roller.

As the strip is advanced through the severing station 74, by the platen roller 50, the timing circuit 104 provides a series of selectively variable, uniformly spaced electrical pulses to the solenoids 102 which reversely actuate the selector valve 98 for thereby reversing the direction of pressure applied to the head of the double-acting piston within the housing of the actuator 84 for thus imparting rectilinear motion to the shaft 80. This rectilinear motion is, in turn, imparted to the knife blade 78 for repetitively driving the blade through the strip 46, to impact against the surface of the platen roller, for thus severing a series of slugs 76 therefrom. Since the actuator 84 is supported for pivotal displacement about the pivot pin 86, in opposition to the tension spring 72 and the compression spring 88, the knife 78 is permitted to follow the periphery of the platen roller 50 so that the blade is permitted to advance from its upstream position to a terminal position wherein the knife 78 is extracted from engagement with the stock material. Thus scraping of the blade along the surface of the platen roller 50 is prevented.

Where the platen roller 50 is driven by the motor 62, the length of the slug 76 can be varied simply by varying the speed of the platen roller 50, without varying the resulting mass of the slug, if so desired. Of course, where the length of the slug 76 is varied by varying the repetition rate for the output pulse derived from the timing circuit 104, the mass of the slug 76 is varied. Accordingly, it is to be understood that it is possible to vary the length of the slug 76 without varying its weight or mass and, conversely, it is possible to vary the mass without varying its length, simply by selectively coordinating the angular velocities of the rollers 14 and 50 with the repetition rate of the pulse derived from the timing circuit 104.

In view of the foregoing, it should readily be apparent that through the instant invention there has been provided a method through which it is now practical to economically provide slugs of resilient materials, such as rubber, having precisely determined masses.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by letters patent is:

1. A method of forming uniform slugs of a moldable elastomeric stock material having a precisely determined mass comprising:
  A. continuously forming from tacky moldable elastomeric stock material an endless tacky sheet having a uniform thickness;
  B. severing and removing from said sheet a continuous tacky strip having a substantially uniform thickness and width;
  C. Adhering and moving said strip on a supporting surface moving at a constant velocity greater than that of said endless sheet to uniformly tension said strip lengthwise within its elastic limit,
  D. and successively transversely severing portions from said strip while said strip is uniformly tensioned by repetitively driving a knife blade through said strip against said surface at regular intervals, thereby forming a succession of slugs having substantially uniform lengths.

2. The method of claim 1 wherein said surface is the peripheral surface of a driven roller and one end of said strip is attached to the peripheral surface of said roller while the other end thereof is connected to said endless sheet and driving the roller in rotation at a rate sufficient for causing the strip to elongate.

3. The method of claim 2 wherein the step of forming a substantially uniformly dimensioned strip includes the steps of forming an endless band of stock material, about the periphery of a mill roller, and severing a strip of stock material from said band of stock material.

* * * * *

UNITED STATES PATENT AND TRADEMARK OFFICE
CERTIFICATE OF CORRECTION

PATENT NO. : 3,954,934
DATED : May 4, 1976
INVENTOR(S) : Gordon L. Newby

It is certified that error appears in the above-identified patent and that said Letters Patent are hereby corrected as shown below:

Col. 1, line 8, delete "NO." and insert ---No.---; and line 9, delete "381,530" and insert ---3,891,373---.

Col. 2, line 24, delete "bonded" and insert ---banded---; and line 30, delete "mass" and insert ---masses---.

Signed and Sealed this

Thirteenth Day of July 1976

[SEAL]

Attest:

RUTH C. MASON
*Attesting Officer*

C. MARSHALL DANN
*Commissioner of Patents and Trademarks*